United States Patent [19]

Oguro et al.

[11] Patent Number: 5,790,572
[45] Date of Patent: *Aug. 4, 1998

[54] COMMUNICATION SYSTEM WITH FRAMING ERROR DETECTION

[75] Inventors: Hirokazu Oguro, Okazaki; Katsumi Takaba, Obu, both of Japan

[73] Assignee: Nippondenso Co., Ltd., Kariya, Japan

[21] Appl. No.: 596,464

[22] Filed: Feb. 5, 1996

[*] Notice: This patent issued on a continued prosecution application filed under 37 CFR 1.53(d), and is subject to the twenty year patent term provisions of 35 U.S.C. 154(a)(2).

[30] Foreign Application Priority Data

Feb. 22, 1995 [JP] Japan ................................. 7-033510
Oct. 24, 1995 [JP] Japan ................................. 7-275877

[51] Int. Cl.$^6$ .......................... G06F 11/00; H04L 12/00
[52] U.S. Cl. .......................... 371/47.1; 371/48; 371/5.1; 371/20.1
[58] Field of Search ........................ 371/47.1, 5.1, 371/48, 20.1, 64; 370/509, 333; 364/514; 375/224, 225

[56] References Cited

U.S. PATENT DOCUMENTS 4,769,761  9/1988  Downes et al. .................. 364/514
4,975,847  12/1990  Abe et al. .
5,228,037  7/1993  Yonehara ........................ 370/509

FOREIGN PATENT DOCUMENTS 2-009251  1/1990  Japan .
6-296294  10/1994  Japan .

OTHER PUBLICATIONS

ISO 9141-2 1994-Feb. 01 "Road vehicles-Diagnostic systems-Part 2", CARB requirements for interchange of digital information.

Primary Examiner—Phung M. Chung
Attorney, Agent, or Firm—Cushman Darby & Cushman IP Group of Pillsbury Madison & Sutro LLP

[57] ABSTRACT

When a framing error occurs in a slave unit, the cause of error is analyzed, and an interruption is inhibited or enabled depending on the cause of error thus, optimal data communication can be performed. When an interrupt request is issued, whether or not the interruption is caused by a framing error is determined. If the interruption is affirmatively caused by a framing error, whether or not framing errors occur two or more times is determined. An interruption is not inhibited (i.e., enabled) for a negative determination.

26 Claims, 11 Drawing Sheets

FIRST SLAVE

FIG. 13A PRIOR ART — INITIALIZATION ADDRESS, $\overline{KW2}$

FIG. 13B PRIOR ART — SYNC, KW1, KW2, $\overline{ADDRESS}$; W1, W2, W3, W4, W4; 5bps, 10.4kbps; INITIALIZATION

FIG. 14A PRIOR ART — REQUEST 1, REQUEST 2

FIG. 14B PRIOR ART — P2, RESPONSE; P3, P2, RESPONSE

FIG. 14C PRIOR ART — P2, RESPONSE

FIG. 14D PRIOR ART — P2, RESPONSE

FIG.15A1 PRIOR ART 
FIG.15A2 PRIOR ART 
FIG.15A3 PRIOR ART 
FIG.15B1 PRIOR ART 
FIG.15B2 PRIOR ART 
FIG.15B3 PRIOR ART 
FIG.15B4 PRIOR ART 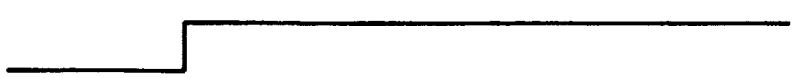

COMMUNICATION SYSTEM WITH FRAMING ERROR DETECTION

BACKGROUND OF THE INVENTION

1. Field of the Invention

The present invention relates to a communication system which performs data transmission and reception between a master unit (e.g., an external unit such as a tester) and slave units (e.g., electronic control units such as an engine controller).

2. Description of Related Art

FIG. 9 shows a known a communication system for the transmission and reception of data between a master unit and slave units. A master unit 100 and slave units 110–130 are connected through a communication line 140 and connection means 150. The slave units 110–130, which have received a request message sent by the master unit 100 over the communication line 140, send response messages for the request message over the communication line 140 sequentially in the order of the priority of the slave units 110–130.

The arrangement of the system shown in FIG. 9 is briefly discussed below. The first slave unit 110 includes a CPU 111 that is used mainly for communication and a CPU 112 that is used mainly for control. The CPU 111 is connected with a communication I/O device 113 which can monitor request messages from the master unit 100 and response messages from other slave units 120 and 130. The CPU 112 is connected with a control I/O device 114 used for control. The CPU 111 and CPU 112 are connected together by a data bus 115.

The CPU 111 incorporates a serial interface (S.I.) 116 which facilitates serial communication, a RAM 117, a ROM 118, etc. The second and third slave units 120 and 130 have the same internal arrangement as the first slave unit 110.

The request message and response message are each formed of multiple 1-byte data (11 bytes at maximum). Each 1-byte data having a 10-bit length consists of a low-active start bit (S), eight data bits (0–7) and a high-active stop bit (P), as shown in FIG. 10.

FIG. 11 shows a serial interface 116 arranged for dealing with request messages and response messages each consisting of 10-bit data. Based on this arrangement, serial-input data received on a serial-input terminal 201 is held by a serial status register 203 by way of a buffer 202.

After the register 203 has detected the start bit (S), the successive data bits (0–7) are shifted into a serial-input shift register 204 at a prescribed baud rate. When the register 203 detects the stop bit (P), the 1-byte data consisting of 10 bits is transferred to a serial-input data register 205, and an interrupt request is generated (refer to FIGS. 12A and 12B) so that the software can access the serial-input data over a data bus 206.

On the other hand, in serial-output mode, output data is written into a serial-output register 207 over the data bus 206 by the software, and the serial output operation is initiated by a controller 208. The register 207 transfers the data to a serial-output shift register 209. Initially, the start bit (S) is released from the serial-output terminal 211 by way of a buffer 210. Subsequently, the second bit (0) through the stop bit (P) are released in the same manner, and an interrupt request is issued to the software.

For a communication system as described above, it is general practice to make initialization prior to the transaction of the above-mentioned messages between the master unit 100 and slave units 110–130. This initialization generally takes place in compliance with the communication procedure stated in the international standard ISO-9141-2. The following briefly explains with reference to FIGS. 13A and 13B the communication procedure based on this international standard.

Initially, the master unit 100, which has confirmed that the communication line 140 has an idle time of 2 ms or more, sends out an initialization address (e.g. 33H) at a baud rate of 5 bps (bits per second) over the communication line 140. The first slave unit 100, having the highest priority, confirms that the idle time is W1 or more, and then sends out a sync signal (e.g., 55H) at a baud rate determined by the initialization address (e.g., 10.4 Kbps) over the communication line 140.

Following the transmission of the sync signal, the first slave unit 110 confirms that the idle time is W2 or more, and then sends out a key word 1 (e.g., 94H) over the communication line 140. Following the transmission of the key word 1, the first slave unit 110 confirms that the idle time is W3 or more, and then sends out another key word 2 (KW2, e.g., 94H) over the communication line 140.

Following the transmission of the KW2 by the first slave unit 110, the master unit 100 confirms that the idle time is W4 or more, and then sends out an inverted version of the KW2 (e.g., 6BH) over the communication line 140.

Following the transmission of the inverted KW2 by the master unit 100, the first slave unit 110 confirms that the idle time is W4 or more, and then sends out an inverted version of the initialization address (e.g., CCH) over the communication line 140. On completion of transmission of this inverted signal, the initialization process is finished.

The other slave units 120 and 130 implement their own initialization process against the master unit 100 and first slave unit 110 by monitoring signals on the communication line 140 with their own I/O devices.

The above-mentioned W1 through W4 are set arbitrarily within the respective ranges of the international standard. These ranges are specifically 60–300 ms for W1, 5–20 ms for W2, 0–20 ms for W3, and 25–50 ms for W4.

On completion of initialization, the transaction (transmission/reception) of a request message and response messages begin between the master unit 100 and slave units 110–130 at the baud rate determined by the initialization address (10.4 kbps in this example). This message transaction complies with the international standard. This communication procedure will be briefly explained with reference to FIGS. 14A–14D.

Initially, when the master unit 100 sends a request message 1 (FIG. 14A) for requesting the execution of certain processes by the slave units 110–130 over the communication line 140, the first slave unit 110, having the highest priority, sends a response message (FIG. 14B) for the request message 1 over the communication line 140 on expiration of an idle time P2 (arbitrary time period in the range from 0 to 50 ms) following the end of transmission of the request message 1.

On completion of transmission of the response message by the first slave unit 110, the second slave unit 120 of the next priority confirms the expiration of the idle time P2 and then sends its own response message (FIG. 14C). Finally on completion of transmission of the response message by the second slave unit 120, the third slave unit 130 of the lowest priority confirms the expiration of the idle time P2 and then sends its own response message (FIG. 14D).

On completion of transmission of the response message by the third slave unit 130, the master unit 100 confirms the expiration of an idle time P3 (arbitrary time period in the range from 55 ms to 5 s) and then sends a second request message 2. The slave units 110–130 send their own response messages sequentially in the same manner as explained above.

The international standard requires that the initialization address of FIG. 13A can be sent if the idle time lasts for 2 ms or more. In the example shown in FIGS. 14A–14D, the idle time P3 after the end of transmission of the response message by the third slave unit 130 until the master unit 100 begins to send the request message 2 will be 55 ms or more. Therefore, it is possible that the master unit 100 can possibly send the initialization address erroneously during this idle time. Namely, during the transaction of messages at a high baud rate of 10.4 kbps, the master unit 100 can possibly send the initialization address at as slow baud rate as 5 bps.

In this event, each of the slave units 110–130 first receives the start bit (low level) of the initialization address from the serial-input terminal 201 (FIG. 11) of the CPU 111, transfers the bit to the registers 204 and 205, and initiates the interrupt process. In this case, the slave units 110–130, which are operative to receive 10.4-kbps data and actually receive the 5-bps start bit, effectively receive a 1-byte data (FIG. 10) of all low-level bits about 200 times repeatedly. Consequently, interrupt requests are generated about 200 times continuously.

FIG 15A1 shows that each of the about 200 input 1-byte data comprise all low bits. Therefore, the CPU cannot detect a correct stop bit (high level) at all interrupt events (FIG. 15A2), resulting in the emergence of a framing error (FIG. 15A3: stop bit lacks the correct level) at all interrupt events.

Accordingly, if the master unit 100 sends the initialization address having a very low baud rate during the transaction of messages having a high baud rate, it causes the slave units 110–130 to issue a number of interrupts. Consequently, the CPU 111 only executes the interrupt process, leaving the base routine and other processing functions uncompleted and the slave units paralyzed.

The above-mentioned problem also arises when the master unit 100 is having normal data transactions (at 10.4 kbps) with multiple slave units (e.g., all slave units 110–130) following the initialization of these slave units and if the master unit 100 initializes one of the slave units (e.g., second slave unit 120).

For coping with this matter, the conventional system provides a detection means for detecting the occurrence of a framing error. The interrupt process is inhibited (FIG. 15B4) from detecting the occurrence of a framing error based on the presumption that the base routine and other processing functions are precluded, as shown in FIGS. 15B1–B4.

However, the following problem will arise in this case. Namely, if the foregoing communication system is used for a land vehicle, for example, the CPU 111 may receive a radio wave from the transceiver or a noise from the ignition system during the message reception by the master unit 100 or slave units 110–130. This noise may cancel the stop bit as in FIGS. 16A–16D shown in correspondence to FIGS. 15A–15D. The reception of this message by a slave unit obviously results in the creation of a framing error.

The cause of framing error creation of this type differs greatly from the type of successive triggering of interrupt process resulting from the transmission of an initialization address at a very low baud rate during the transaction of a message at a high baud rate as mentioned above.

However, the above-mentioned conventional scheme serves to inhibit the interrupt process in response to the framing error creation. Therefore, each slave unit will not be able to receive a message from the master unit 100 or other slave unit as shown in FIGS. 16A–16D.

When the vehicle is started during the reception of a message by the master unit 100 or slave units 110–130, the power voltage to the slave units 110–130 will fall because of the starting operation, resulting possibly in the cancelling of data of the message. The stop bit of the message may be canceled, and the reception of the message obviously results in the creation of a framing error.

The cause of framing error creation of this type also differs greatly from the type of successive triggering of interrupt process, and the above-mentioned conventional scheme also serves to inhibit the interrupt process in response to the framing error creation. Therefore, each slave unit will not be able to receive a message from the master unit 100 or other slave unit.

SUMMARY OF THE INVENTION

The present invention is intended to deal with the foregoing problem, and its object is to provide a communication system which inhibits the interrupt process at the occurrence of a framing error. The system examines the cause of the framing error and inhibits the interrupt process to thereby allow a base routine and other processing functions to take place if the cause of framing error is to trigger a number of interrupt processes.

According to the invention, a framing error detection does not inhibit an interrupt process immediately at the detection of a framing error, but the interrupt process is inhibited in response to the determination of the detection of framing errors at a high frequency. Accordingly, even if the framing error occurs, the interrupt process is not inhibited unless the cause of framing error creation generates framing errors at a high frequency, e.g., such as in a case where a noise caused the cancellation of the stop bit, and consequently, the inherent data communication based on this interrupt process can be performed effectively. If the cause of framing error creates framing errors at a high frequency, the interrupt process is inhibited, and the base routine and other processing functions are performed on a priority basis.

Preferably, it is determined whether or not the framing error is detected a certain number of times or more continuously. Thus, when framing errors occur continuously for at least a certain number of times or more, the cause of the framing errors is assumed to trigger a number of interrupt processes continuously, and the interrupt process is inhibited.

Preferably, it is determined whether or not the number of times the framing errors are detected is a certain proportion or more than the number of times of interrupt process is initiated. Alternatively, it is determined whether or not the number of times that the framing errors are detected is a certain proportion or more in a specific time period since the first detection of a framing error.

Preferably, the slave units are installed on a land vehicle. In this case, although framing errors may occur in slave units due to the noise or the starting of the vehicle, the interrupt process is enabled, and the inherent data communication based on the interrupt process can be performed effectively.

According to the invention, in a slave unit, an interrupt process inhibition does not occur when the cause of the framing error does not create framing errors at a high frequency thus, allowing inherent data communication based on the interrupt process to occur effectively. The interrupt process inhibition occurs when the cause of the framing errors creates a number of interrupt processes continuously, thus allowing the base routine and other processing functions to occur on a priority basis.

BRIEF DESCRIPTION OF THE DRAWINGS

In the accompanying drawings:

FIGS. 13A and 13B are timing charts of the signals transacted between the master unit and a slave unit during the initialization process;

FIGS. 14A–4D are timing charts showing the transmission procedure of the request message and response message transacted between the master unit and slave units;

FIGS. 15A1–15A3 are timing charts of the signals at the reception of the 5-bps initialization address during the communication at 10.4 kbps by the CPU, and FIGS. 15B1–15B4 are timing charts same signals in FIGS. 15A1–15A3 when the interrupt is inhibited in response to the detection of a framing error.

DETAILED DESCRIPTION OF PRESENTLY PREFERRED EMBODIMENTS

Figure 1:
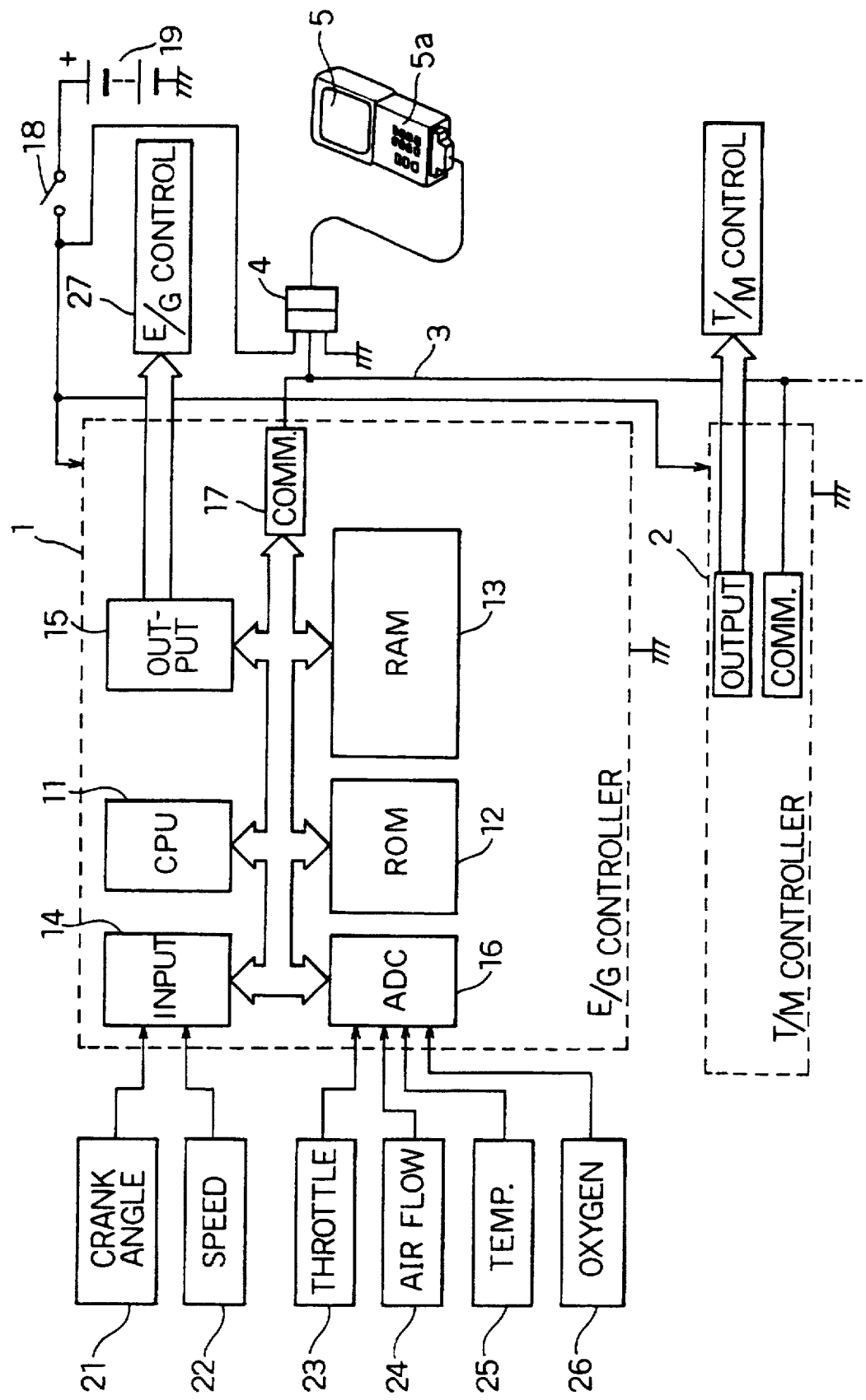
FIG. 1 is an overall block diagram of the first embodiment of this invention.

The present invention will be described with reference to various embodiments illustrated in the accompanying drawings.

The first embodiment of this invention illustrated in FIGS. 1–5 is applied to a diagnostic system for a land vehicle.

The system of this embodiment includes a plurality of electronic controllers (engine controller 1, transmission controller 2, etc.) as slave units installed on the vehicle An externally-connected fault diagnostic tester 5 forms a master unit connected through a communication line 3 and a diagnostic connector 4. Data communication takes place between the fault diagnostic tester 5 and individual electronic controllers in 1-to-n relationship.

The electronic controllers are given, in advance, the priority order for carrying out the 1-to-n data communication. When the fault diagnostic tester 5 sends a request message for requesting the execution of certain processes of the electronic controllers over the communication line 3, the electronic controllers return their response messages sequentially in the order of priority over the communication line 3. Specifically, in this embodiment, the priority order is set such that the transmission controller 2 has the higher priority over the engine controller 1.

It is assumed that the communication between the fault diagnostic tester 5 and the vehicle-installed electronic controllers is based on the protocol which complies with the international standard (ISO-9141-2). The following explains the structure and function of the engine controller 1 as an example of the vehicle-installed electronic controllers.

The engine controller 1 includes a CPU 11, ROM 12, RAM 13, input circuit 14, output circuit 15, A/D converter 16, and communication circuit 17. The communication circuit 17 is an input/output buffer circuit which drives the communication line 3.

The input circuit 14 receives sensor signals, which are mainly pulse signals, produced by a sensor 21 for detecting the number of revolutions of the engine (specifically the crank angle sensor) and a sensor 22 of the vehicle speed. The A/D converter 16 receives sensor signals, which are analog signals, produced by a throttle sensor 23, air flow meter 24, water temperature sensor 25 and oxygen sensor 26 disposed in various sections of the vehicle.

These signals are stored as sensor data of detected values in the data area of the RAM 13, and the data are used by the CPU 11 for the calculation of the amount of fuel injection and timing of ignition. Besides the data area, the RAM 13 has areas for the counters, buffers and flag registers, as explained below.

The CPU 11 implements the prescribed computations for the sensor data stored in the RAM 13 in accordance with control programs which are stored, in advance, in the ROM 12. Thus, the fuel injection value, ignition timing, the transaction (i.e., transmission/reception) of communication messages with the fault diagnostic tester 5 as explained below and the diagnostic processes specified by the messages are determined. The control programs stored in the ROM 12 include a counter program which performs the counting using software for the counters in the RAM 13.

The fuel injection value computed by the CPU 11 is fed to the output circuit 15, which delivers a signal representing the amount of fuel injection to an engine control means 27. The engine control means 27 is a fuel injection valve for example.

Figure 11:
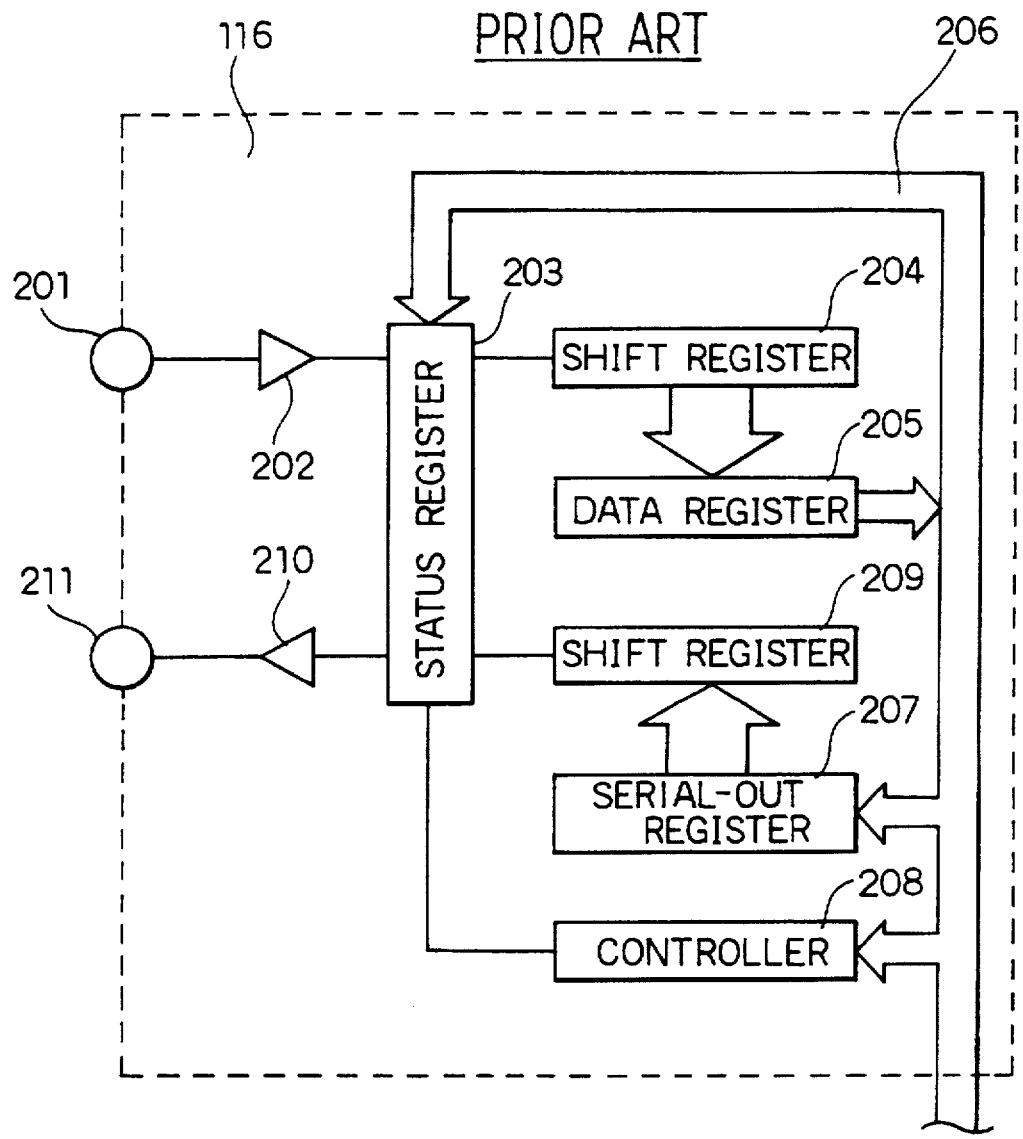
FIG. 11 is a block diagram showing the internal arrangement of the serial interface 116 of the system shown in FIG. 9.
Figure 12A:
FIGS. 12A and 12B are timing charts of the signals at the input of serial-input data to the CPU.
Figure 12B:
Figure 16A:
FIGS. 16A–16D are timing charts of the signals when a framing error occurs due to a noise.
Figure 16B:
Figure 16C:
Figure 16D:
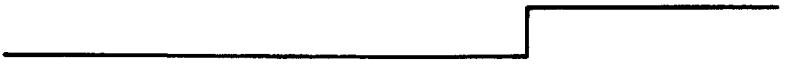

The CPU 11 incorporates a serial interface (not shown) which facilitates the serial communication. The serial interface has an internal arrangement shown in FIG. 11.

The fault diagnostic tester 5 is arranged to include a CPU, ROM, RAM, communication circuit, etc. as in the case of the electronic controller explained above. The fault diagnostic tester 5 has its diagnostic mode set by the inspector on an operation means 5a (e.g., a keyboard) provided on the external surface of the fault diagnostic tester 5. A request message which depends on the diagnostic mode is sent through the diagnostic connector 4 to the electronic controllers.

The fault diagnostic tester 5 is capable of informing the result of diagnosis to the inspector by listing or graphically displaying the content of response message for the request message on a display device (not shown).

The diagnostic connector 4 is supplied with electric power from a battery 19 by way of an ignition switch 18 so that power is supplied to the fault diagnostic tester 5 through the diagnostic connector 4 when the tester 5 is coupled electrically to the vehicle-installed electronic controllers.

The vehicle communication system explained above performs the initialization process for the fault diagnostic tester 5 and electronic controllers prior to the message transaction between the fault diagnostic tester 5 and electronic controllers. The initialization process has been explained in connection with FIG. 13 and is not repeated here.

Following the initialization process, the message transaction takes place between the fault diagnostic tester 5 and electronic controllers. The message transaction has been explained in connection with FIG. 14 is not repeated.

Next, the initialization process and response message transmission process performed by each electronic controller will be explained in detail with reference to FIGS. 2–5. The counters, buffers and flag registers used in the processes explained in the following are all initialized to "0" when the ignition switch 18 is turned on and power is supplied to the electronic controllers.

Figure 2:
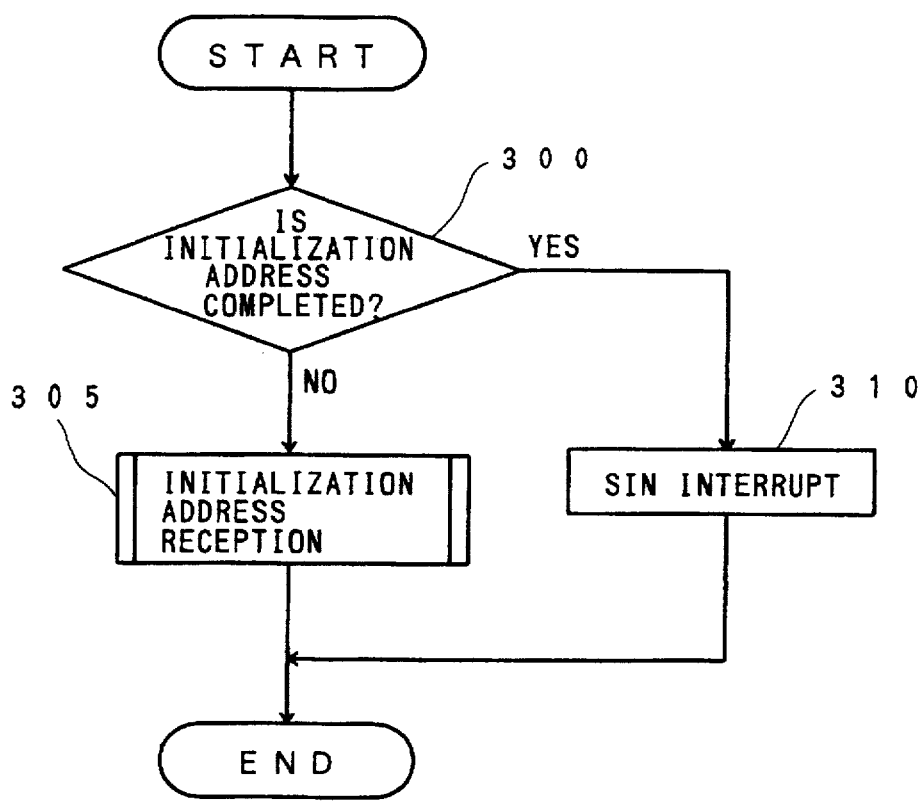
FIG. 2 is a flowchart showing the initialization address reception process carried out by each controller of the first embodiment.
Figure 6A:
FIGS. 6A–6D are timing charts of the signals at the reception of the 5-bps initialization address during the waiting period of the CPU for data reception at 10.4 kbps according to the first embodiment.
Figure 6B:
Figure 6C:
Figure 6D:

Initially, an interrupt routine of FIG. 2 is initiated at a 2-ms interval so as to receive the initialization address (FIG. 13A) sent by the fault diagnostic tester 5 at 5 bps (200 ms for one bit). Step 300 of the routine determines whether or not data is loaded in address data buffers (1)–(10), which will be explained below, thereby determine to whether or not the reception of initialization address has completed.

Figure 3:
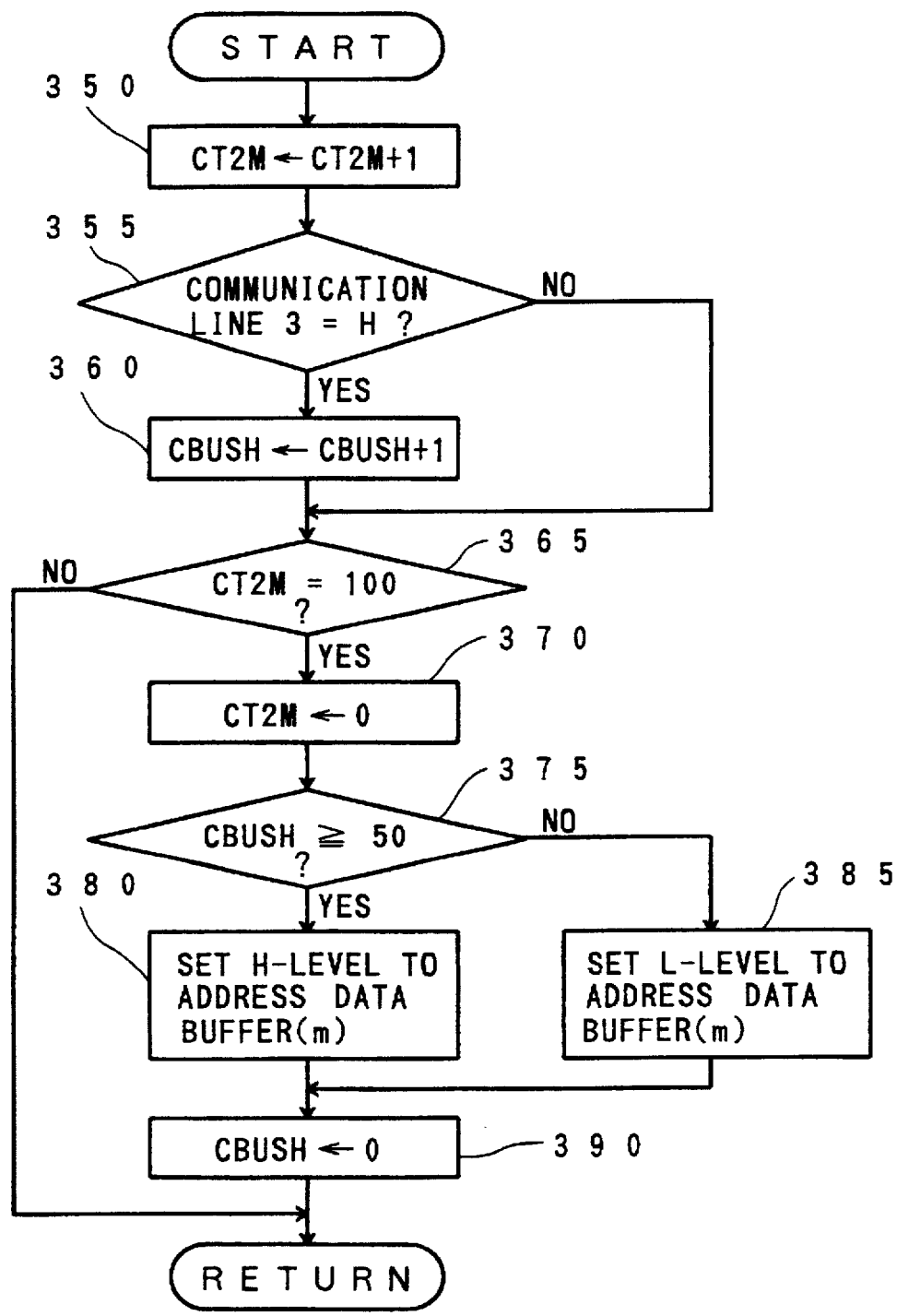
FIG. 3 shows the subroutine of step 305 of FIG. 2.

If, in the step 300, the initialization address reception is incomplete, i.e., data is absent in the address data buffers (1)–(10), the sequence at step 305 branches to a subroutine shown in FIG. 3. The subroutine of FIG. 3 prepares for the reception of 1-bit data of the initialization address. Specifically, the first step 350 increments an address reception counter CT2M, and the next step 355 determines whether or not the communication line 3 has a high level (H).

If the communication line 3 is detected as having a high level, the next step 360 increments a counter CBUSH which counts the number of times the high-level is detected on communication line 3, and the sequence proceeds to step 365, or otherwise on detecting the communication line 3 to be of low level, the sequence proceeds intact to step 365.

The step 365 determines whether or not the counter CT2M has reached 100, thereby determining whether or not the all 1-bit data of the initialization address have been received. If the determination is negative, indicative of the incompletion of reception of the 1-bit data, the sequence goes out of this routine intact.

Otherwise, for an affirmative determination, indicative of the completion of reception of all 1-bit data, the next step 370 clears the counter CT2M, thereby preparing for the reception of the next 1-bit data.

The next step 375 determines whether or not the counter CBUSH has reached a certain number (50 in this embodiment). If this determination is affirmative indicative of the reception of high-level 1-bit data, the next step 380 sets an address data buffer (m) at a high-level "1". Subsequently, step 390 clears the counter CBUSH, thereby preparing for the reception of the next 1-bit data, and the sequence leave this subroutine.

Otherwise, if the determination is negative indicative of the reception of low-level 1-bit data, step 385 sets to the address data buffer (m) at a low-level "0". Subsequently, the step 390 clears the counter CBUSH, and the sequence leaves this subroutine.

The process of step 305 (FIG. 2) is repeated until the data of the initialization address is set in all address data buffers (1)–(10), resulting in an affirmative determination in the step 300, and then the process of step 310 is carried out.

Figure 5:
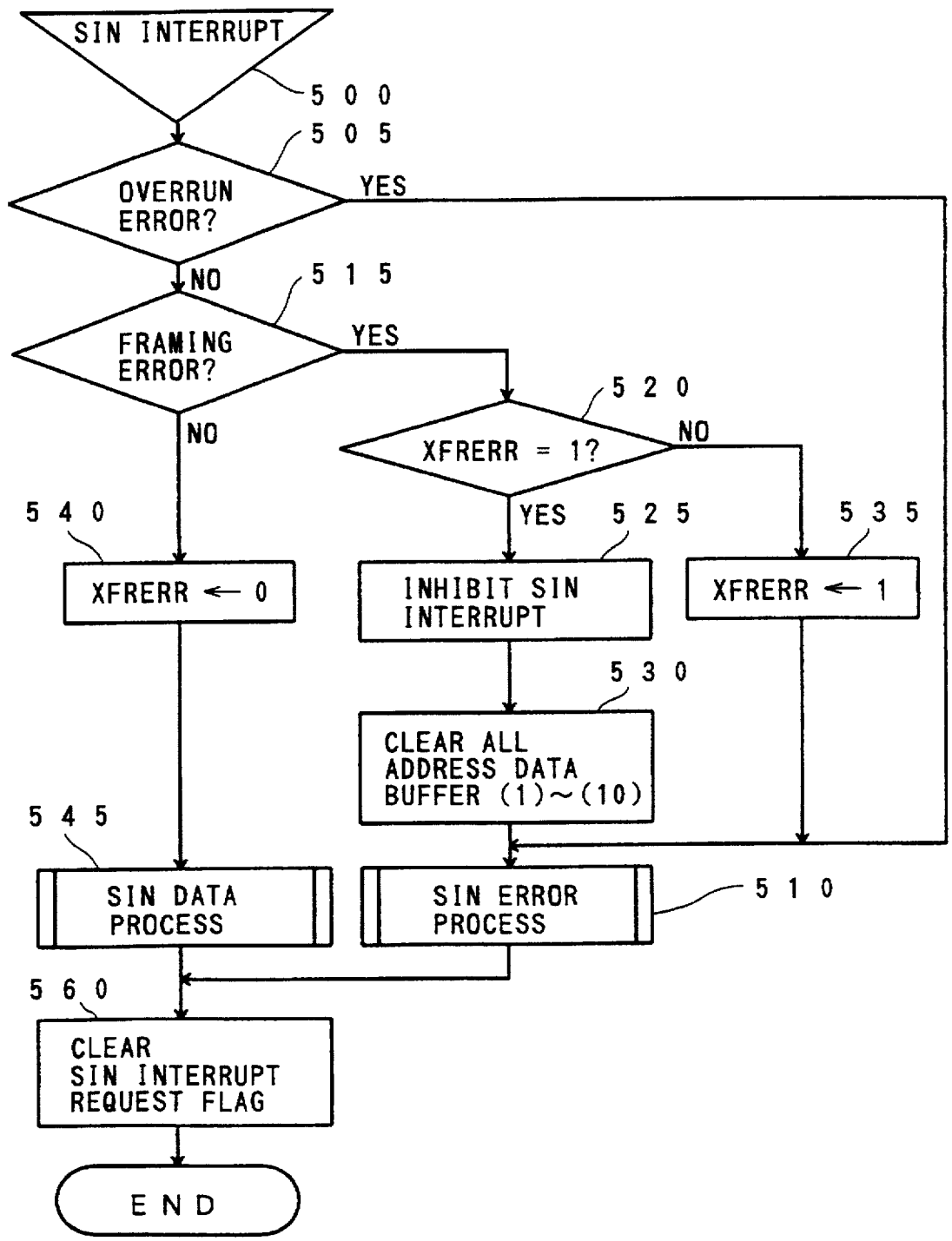
FIG. 5 is a flowchart showing the serial-input interrupt process performed by each controller of the first embodiment.

The step 310 sets the interrupt mask flag to thereby enable the serial-input interrupt process (SIN interrupt process), and resets a flag XFRERR. The flag XFRERR, which will be explained below in connection with FIG. 5, is set when a framing error has occurred.

Figure 4:
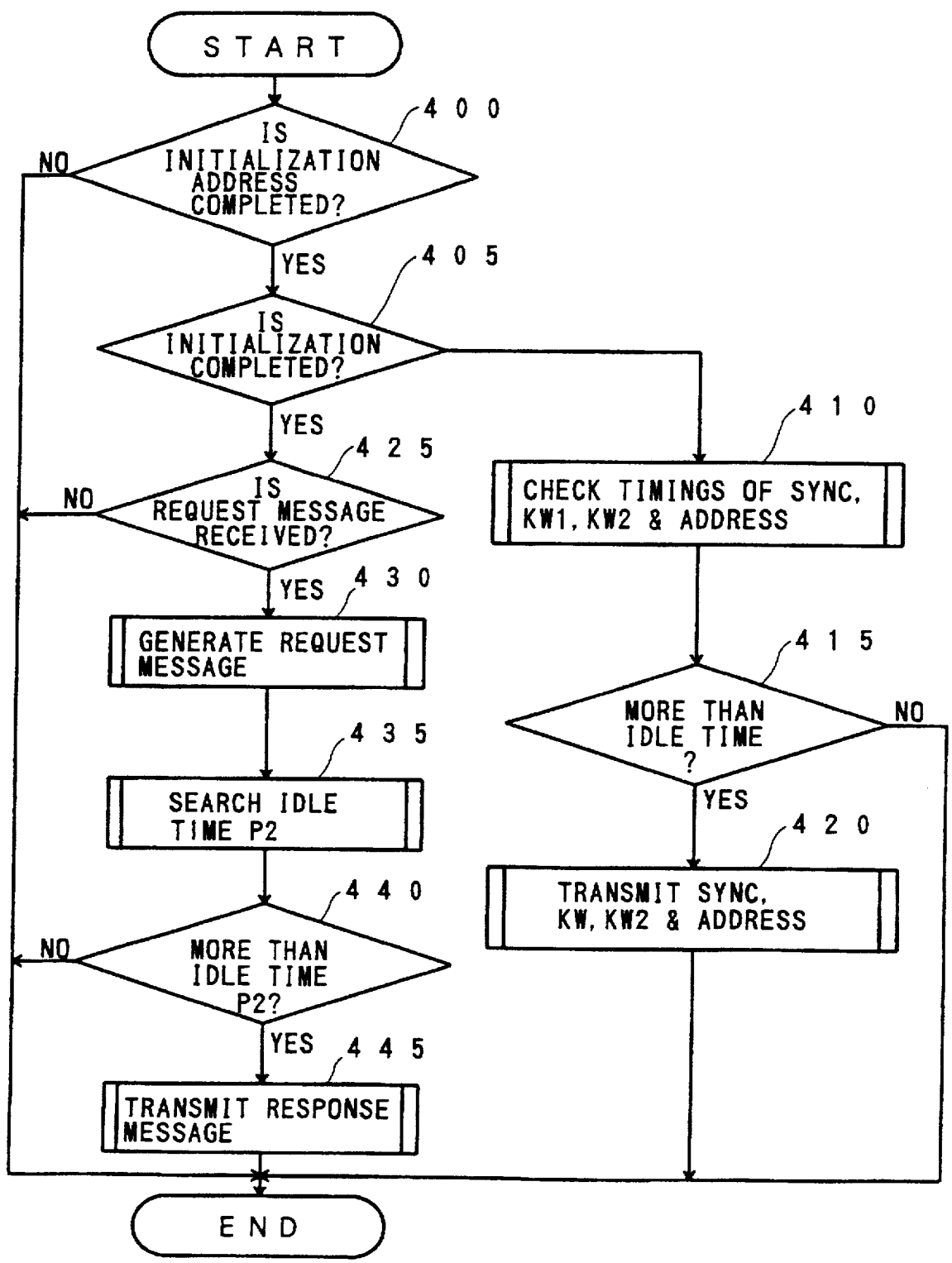
FIG. 4 is a flowchart showing the base routine performed by each controller of the first embodiment.

Each electronic controller has an individual base routine as shown in FIG. 4, besides the processes of FIGS. 2 and 3. Step 400 of this routine determines whether or not the initialization address is set in the address data buffers (1)–(10) to thereby detect whether or not the reception of the initialization address has completed. If the initialization address is incomplete, the sequence goes out of this process intact.

Otherwise, if the initialization address is detected as being complete in step 400, the next step 405 determines whether or not the initialization process is entirely completed by determining whether or not the transmission of the inverted initialization address of FIG. 13 has completed. If incomplete, the sequence branches to the subroutine of step 410.

The step 410 searches the ROM 12 for the idle time (W1–W4) for the signal to be sent among the sync signal, KW1, KW2 and inverted signal of initialization address. For example, when the sync signal is about to be sent, the step 410 searches the ROM 12 for the time W1.

The next step 415 determines whether or not the idle counter which counts the idle time is greater than or equal to the idle time that had been retrieved in step 410. If the determination is affirmative, the next step 420 transmits the signal, and the sequence leaves the routine. Otherwise, if the determination is negative, the sequence leaves the routine intact. The idle counter is increased by one for each time interrupt (e.g.,4-ms interrupt) based on a timer (not shown).

The step 410 includes a step for determining whether or not the inverted KW2 signal from the fault diagnostic tester 5 has been received.

On the other hand, if the step 405 detects the completion of the entire initialization process, the next step 425 determines whether or not a request message from the fault diagnostic tester 5 has been received.

If it is determined that no request message was received, the sequence leaves the routine intact, or if it is determined that a request message is received, the sequence branches to a subroutine of step 430 to thereby generate a response message for the request message.

The next step 435 searches the ROM 12 for the idle time P2 (24 ms in this embodiment) needed for the transmission of this response message. The next step 440 determines whether or not the idle counter is greater than or equal to the retrieved idle time P2. In the affirmative, step 445 transmits the response message, and the sequence leaves the routine.

When the initialization address is completed received, each electronic controller enters the state of serial communication at 10.4 kbps. The serial communication occurs in the SIN interrupt process shown in FIG. 5 as explained below. The SIN interrupt process is triggered by a serial-input interrupt to the CPU.

Specifically, the SIN interrupt of step 500 is issued at each reception of the inverted KW2 signal or 1-bit data of request message from the fault diagnostic tester 5, or the sync signal, KW1, KW2, inverted initialization address signal or 1-bit data of response message from another electronic controller.

The next step 505 determines whether or not this SIN interrupt process has been triggered by an overrun error based on the overrun error flag which is set at the occurrence of an overrun. The overrun error signifies that when the serial-input terminal 201 of FIG. 11 receives 10-bit serial data and the data is transferred to the register 204, other data is already loaded in the data destination register 205.

If step 505 determines the SIN interrupt process is triggered by overrun error, the sequence branches to the subroutine of step 510 to thereby perform the process for the occurrence of an SIN error (e.g., clearing the serial data buffer for loading the SIN data). The next step 560 clears the SIN interrupt request flag, thereby preparing for the acceptance of SIN interrupt of the next byte data. The SIN interrupt request flag, which records the acceptance of an interrupt request, is set on a hardware basis when an interrupt request is issued.

If step 505 determines that this SIN interrupt process has not been triggered by overrun error, step 515 determines whether or not this SIN interrupt process has been triggered by a framing error flag which is set at the occurrence of a framing error. The framing error signifies that the stop bit is not a correct value.

If step 515 determines the SIN interrupt process is triggered by framing error, step 520 determines whether or not the flag XFRERR is set, thereby determining whether or not framing errors have occurred two or more times. In the determination is negative, i.e., if the framing error is determined to be the first one, step 535 sets the flag XFRERR. After steps 510 and 560 are carried out, the sequence leaves this routine.

If an affirmative result is determined in step 520, indicative of the occurrence of two or more framing errors, step 525 resets the interrupt mask flag to thereby inhibit the SIN interrupt process by blocking another SIN interrupt request from entering the CPU and prepare for the reception of the initialization address. Consequently, the process of FIG. 2 occurs continuously without suspension.

Step 530 clears the address data buffers (1)–(10) so that the step 300 of FIG. 2 makes a negative determination. Subsequently, the processes of steps 510 and 560 are performed, and the sequence leaves this routine.

On the other hand, if the step 515 determines that the SIN interrupt process has not been triggered by a framing error, step 540 resets the flag XFRERR. The sequence then branches to a subroutine of step 545 to perform the process for loading the SIN data into the serial data buffer. Finally, the process of step 560 is carried out.

In the embodiment described above, when the step 515 detects the occurrence of a framing error, the step 520 further determines whether or not framing errors occur two or more times. Step 525 inhibits the SIN interrupt process only if it is determined that framing errors have occurred two or more times. Otherwise, if framing errors have not occurred two or more times, the step 540 resets the flag XFRERR to keep the SIN interrupt process enabled for the following reason.

Possible cases of an affirmative determination in step 515 include the reception of the 5-bps initialization address while the CPU waits for 4-kbps data reception, and the reception in the CPU 11 of a faulty stop bit of data canceled by a radio wave from the transceiver or a noise from the ignition system.

In the former case, a number of framing errors occur continuously, resulting in an affirmative determination in step 520. Therefore, the base routine and other processes do not occur unless the SIN interrupt process is inhibited. Thus, the step 530 inhibits the SIN interrupt process so that the base routine and other processes occur depending on a priority according to this embodiment.

In the latter case, it is fairly appreciated that the cancellation of a stop bit by a noise will not occur two or more times. Accordingly, the step 515 in the next cycle will make a negative determination. Based on this presumption, in this embodiment, the step 540 resets the flag XFRERR to retain the SIN interrupt process in an enabled state so that the inherent data communication based on the SIN interrupt can occur.

In this embodiment, the step 525 inhibits the SIN interrupt process at the reception of the 5-bps initialization address while the CPU 11 waits for 4-kbps data reception, as in the former case. However, when of initialization address reception is completed, the step 300 of FIG. 2 makes an affirmative determination, which is followed by the process of step 310, and the SIN interrupt process can resume.

FIGS. 6A–6D show timing charts of the data signal on the data bus (FIG. 6A), interrupt request signal (FIG. 6B), framing error signal (FIG. 6C) and interrupt inhibit signal (FIG. 6D) at the time of reception of the 5-bps initialization address while the CPU 11 waits for 10.4-kbps data reception.

Next, the second and third embodiments of this invention will be explained only for the portions which are different from the first embodiment.

The second and third embodiments are based on the following presumptions (1) and (2).

(1) Normally, when the 5-bps initialization address is received during the serial communication at 10.4 kbps, framing errors occur continuously as described above. However, these framing errors may not occur continuously in the presence of external noises during the reception of initialization address.

(2) It is fairly appreciated that external noise attack during the initialization address reception will not arise a number of times continuously.

Based on these presumptions (1) and (2), the second embodiment is designed to inhibit the SIN interrupt process when the number of times that the framing errors occur is a certain proportion or more than the number times that of SIN interrupt process is triggered. The third embodiment is designed to inhibit the SIN interrupt process when the number of times that the framing errors occur is a certain proportion or more during a certain time period since the first occurrence of a framing error.

The second and third embodiments are designed to inhibit the SIN interrupt process when framing errors occur at a high frequency even if the occurrence of framing errors is not continuous.

The specific method of performing the second and third embodiments will be explained in connection with FIG. 7 and FIG. 8, respectively. Processing steps identical to those of the first embodiment (FIG. 5) are referred to by the same reference numerals, and an explanation thereof is omitted.

Figure 7:
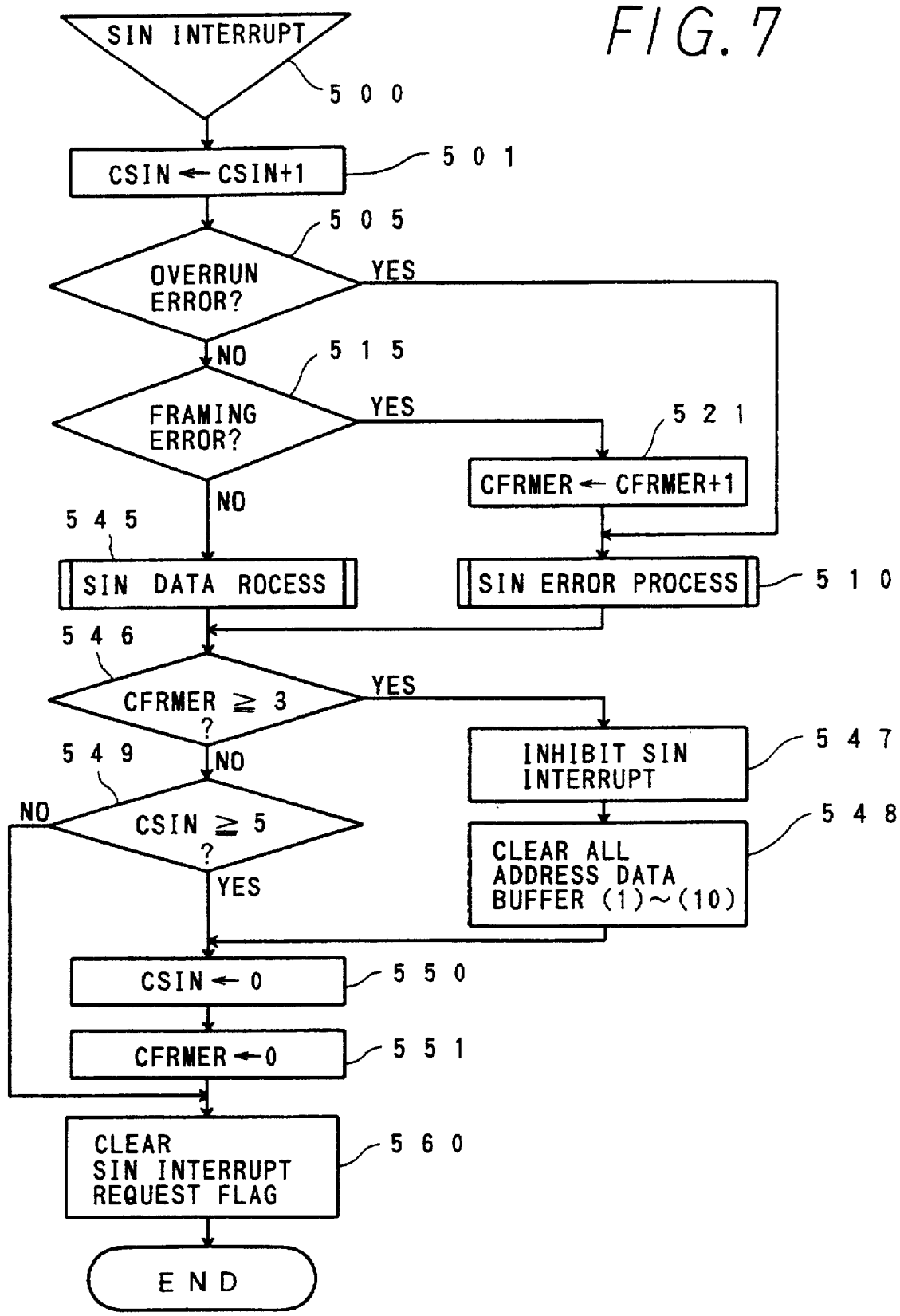
FIG. 7 is a flowchart showing the serial-input interrupt process performed by each controller of the second embodiment of this invention.

In the second embodiment shown in FIG. 7, the SIN interrupt process of step 500 is initiated at each reception of the inverted KW2 signal or 1-bit data of request message from the fault diagnostic tester 5 or the sync signal, KW1, KW2, inverted initialization address signal or 1-bit data of response message from another electronic controller.

The next step 501 increments a counter CSIN which counts the number of times the SIN interrupt process is triggered. Subsequently, when step 505 makes an affirmative determination in the process of step 510 is carried out, or the sequence proceeds to step 515 for a negative determination.

In the case of an affirmative determination in step 515, step 521 increments a counter CFRMER which counts the number of times framing errors occur, and the process of step 510 is performed. Otherwise, if the step 515 makes a negative determination, the process of step 545 is performed.

The next step 546 determines whether or not the counter CFRMER is greater than or equal to a certain number (3 in this embodiment). In the affirmative, indicative of the occurrence of framing errors at a high frequency, the following steps 547 and 548 perform the same processes as the steps 525 and 530 of FIG. 5. Steps 550 and 551 clear the counters CSIN and CFRMER, and following the completion of step 560, the sequence leaves this routine.

On the other hand, if the step 546 makes a negative determination, the next step 549 determines whether or not the counter CSIN becomes greater than or equal to a certain number (5 in this embodiment). In the case of a negative determination, the process of step 560 is performed, and the sequence leaves this routine. In an affirmative determination, the processes of steps 550, 551 and 560 are performed, and the sequence leaves this routine.

In the second embodiment, as described above, the SIN interrupt process is inhibited if the number of times that the framing errors occurs is a certain proportion of more than the number of times the SIN interrupt process is triggered (three framing errors with respect to five events of SIN interrupt process in this embodiment). Consequently the SIN interrupt process can be inhibited even in the event of an external noise attack during the reception of initialization address.

Figure 8:
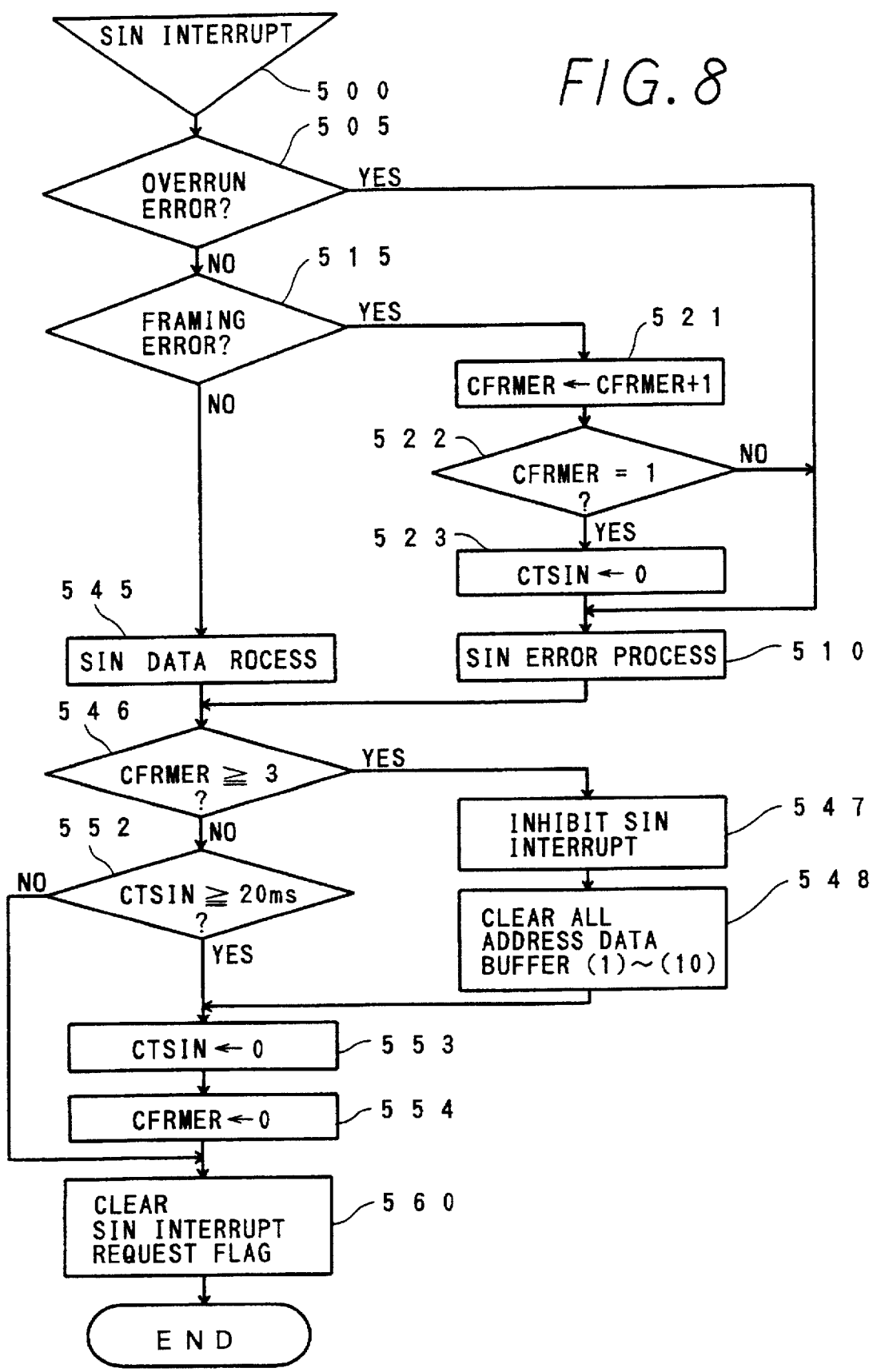
FIG. 8 is a flowchart showing the serial-input interrupt process carried out by each controller of the third embodiment of this invention.
Figure 9:
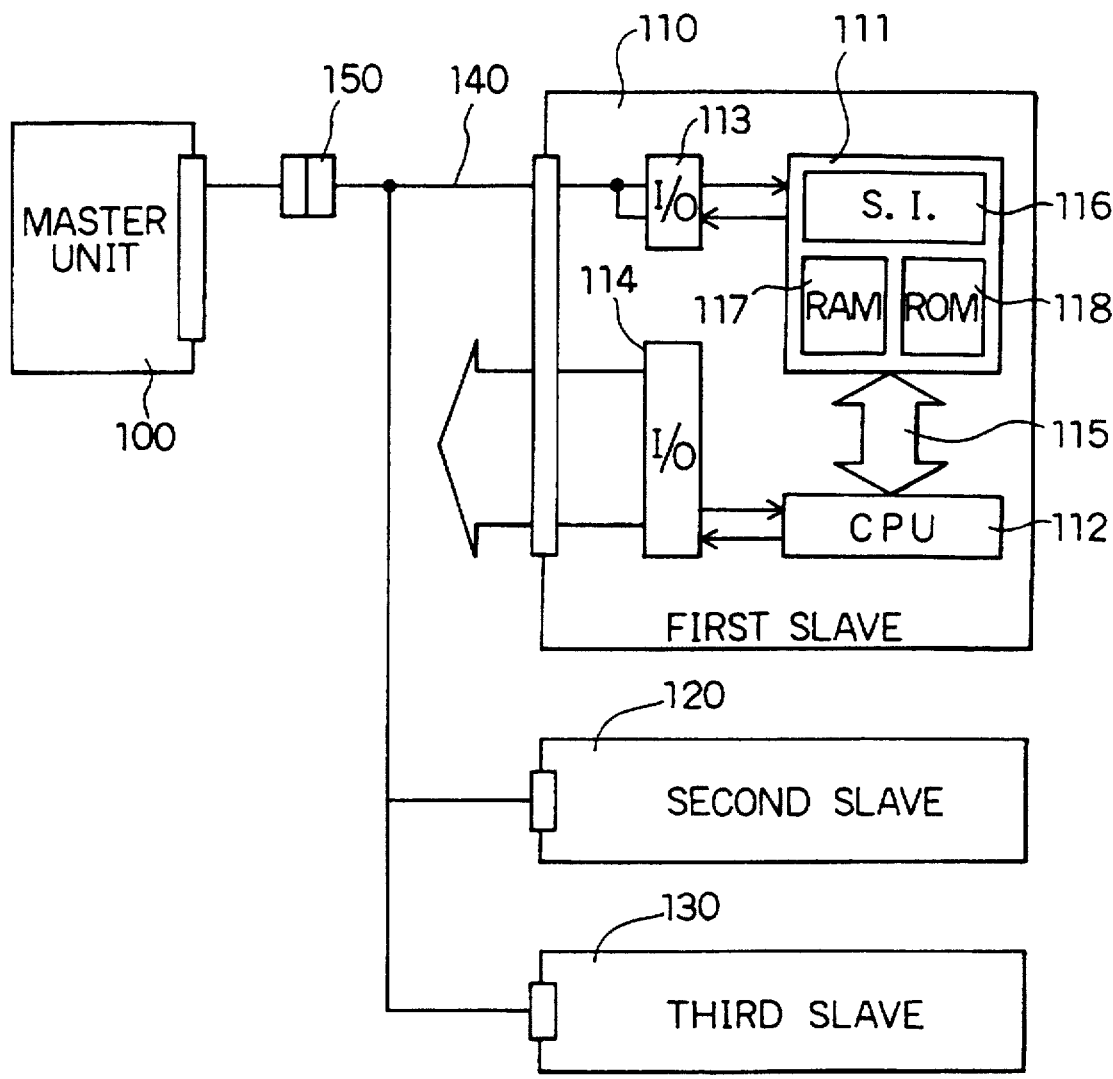
FIG. 9 is an overall block diagram of the conventional communication system.
Figure 10:
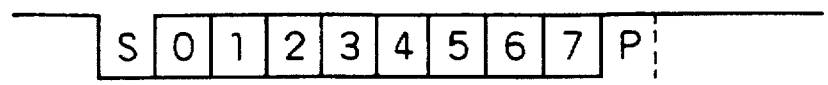
FIG. 10 is a timing chart showing the bit format of 1-byte data.

FIG. 8 shows the third embodiment in which the SIN interrupt process of step 500 is initiated at each reception of the inverted KW2 signal or 1-bit data of request message from the fault diagnostic tester 5 or the sync signal, KW1, KW2, inverted initialization address signal or 1-bit data of response message from other electronic controller.

If the process of the step 505 makes an affirmative determination, the process of step 510 is performed. Otherwise, the process of step 515 is performed for a negative determination. If the step 515 makes a negative determination, the process of step 545 is performed. Otherwise, the process of step 521 is performed for an affirmative determination.

Following the process of step 521, the next step 522 determines whether or not the counter CFRMER is "1", thereby determining whether or not the framing error has occurred once.

If the step 522 makes an affirmative determination, the next step 523 clears a counter CTSIN which counts the time expiration since the first occurrence of framing error, and the process of step 510 is carried out. Otherwise, if the step 522 makes a negative determination, the sequence proceeds intact to step 510. The counter CTSIN is increased by one for each timer interrupt (2-ms interrupt).

If the determination of the step 546 is affirmative, the processes of steps 547 and 548 are performed. Steps 553 and 554 clear the counters CSIN and CTSIN, and following the process of step 560, the sequence performs this routine.

On the other hand, if the step 546 makes a negative determination, step 552 determines whether or not the counter CSIN becomes greater than or equal to a certain time period (20 ms in this embodiment). In the case of a negative determination, the process of step 560 is performed, and the sequence leaves this routine. In the case of an affirmative determination, the processes of steps 553, 554 and 560 are performed, and the sequence leaves this routine.

In this embodiment, as described above, the SIN interrupt process is inhibited if the number of times that the framing errors occur is a certain proportion (3 times) or more within a certain time period (20 ms) since the first occurrence of framing error. Consequently, the SIN interrupt process can be inhibited even in the event of an external noise attack during the reception of an initialization address.

In addition, the present invention may be modified in the following manner.

In the routine of FIG. 3, the processes of steps 355 and 360 may be altered to load data that is being received currently into a reception buffer (n), with the determination of step 375 being altered to determine whether or not certain pieces (e.g., 50) or more of data among the data loaded in the reception buffers (1)–(100) are at a high level. In this case, the step 390 clears all reception buffers (1)–(100).

Although the step 520 of the first embodiment determines whether or not two or more framing errors have occurred continuously based on the state of the flag XFRERR, an alternative scheme is to provide a counter for counting the number of times of the framing errors continuously occur and inhibit the SIN interrupt process only when the count value become a certain number or more.

In this case, the prescribed number of occurrences may be set to be the number of times framing errors occur at the starting of the vehicle so that the SIN interrupt is enabled despite the framing errors occurring at the starting of the vehicle, thereby allowing the inherent data communication based on the SIN interrupt.

Although in the foregoing embodiments, the request message and response message are formed of multiple 1-byte data, these messages may be formed of multiple 2-byte data, or multiple 4-byte data, or even longer byte data.

Although the foregoing embodiments are systems including the fault diagnostic tester 5 as a master unit and electronic controllers as slave units, the present invention can be applied to systems in which arbitrary one of electronic controllers is a master unit and remaining electronic controllers are slave units.

Although the foregoing embodiments are communication systems used for land vehicles, the present invention can be applied to control objects other than land vehicles.

Although the foregoing embodiments are communication systems which perform data communication between a master unit and multiple slave units in 1-to-n relationship, the present invention can be applied to communication systems which perform data communication between a master unit and a slave unit in 1-to-1 relationship.

What is claimed is:

1. A communication system including a master unit and slave units connected through a communication line, said master unit sending a request message that is formed of a plurality of byte data through said communication line for requesting the execution of a certain process, said slave units initiating an interrupt process upon detecting a stop bit of the byte data of said request message to thereby receive the byte data of said request message or sending a response message that is formed of a plurality of byte data over said communication line upon receiving all of the byte data of the request message, said slave units including:

framing error detection means for detecting a framing error which occurs when the stop bit of the byte data of the request message received by said slave units is not a correct value;

frequent occurrence determination means which determines how frequently framing errors are detected by said framing error detection means and whether or not said framing error detection means has detected a high number of framing errors; and interrupt process inhibit means which inhibits the interrupt process in response to the determination by said frequent occurrence determination means that said framing error detection means has detected a high number of framing errors;

wherein said master unit sends an initialization address, which is slower in communication speed than the transmission/reception speed of the request message and the response message and is formed of byte data, through said communication line;

said slave units are installed on a land vehicle; and the detection of the high number of framing errors is used to eliminate framing errors caused by a noise signal in the vehicle.

2. The communication system according to claim 1, wherein said slave units include:

initialization address reception means which receives bit data of the initialization address after said interrupt process inhibit means has inhibited the interrupt process, said initialization address reception means carrying out the reception process for all bit data of the initialization address.

3. The communication system according to claim 2, wherein said initialization address reception means samples 1-bit data of the initialization address at a certain timing and determines the 1-bit data to be of a high level or low level based on the sampled value.

4. The communication system according to claim 2, wherein said initialization address reception means includes:

sampling means which samples 1-bit data of the initialization address at a certain timing;

number-of-sampling determination means which determines whether or not the number of times of sampling has reached a certain count value; and 1-bit data determining means which determines the 1-bit data to be a high level or low level based on the sampled value in response to the determination of said number-of-sampling determination means that the number of times of sampling has reached the count value.

5. The communication system according to claim 2 further including:

interrupt process enabling means which enables the interrupt process on completion of the reception process for all bit data of the initialization address by said initialization address reception means.

6. The communication system according to claim 1, wherein said frequent occurrence determination means comprises:

means for determining whether or not said framing error detection means has detected framing errors at least a certain number of times.

7. The communication system according to claim 1, wherein said frequent occurrence determination means comprises:

means for determining whether or not the number of times framing errors are detected by said framing error detection means is a certain proportion or more than the number of times the interrupt process is initiated.

8. The communication system according to claim 1, wherein said frequent occurrence determination means comprises:

means for determining whether or not the number of times framing errors are detected by said framing error detection means is a certain proportion or more during the time period since the first detection of said framing error by said framing error detection means.

9. The communication system according to claim 1, wherein said slave units control an operation of said land vehicle; and said slave units and said master unit communicate vehicle-related data through said communication line.

10. The communication system according to claim 9, wherein said operation of said land vehicle controlled by said slave units is an engine operation.

11. The communication system according to claim 9, wherein said operation of said land vehicle controlled by said slave units is a transmission operation.

12. The communication system according to claim 9, wherein said slave units include:

initialization address reception means which receives bit data of the initialization address after said interrupt process inhibit means has inhibited the interrupt process, said initialization address reception means carrying out the reception process for all bit data of the initialization address.

13. The communication system according to claim 12, wherein said initialization address reception means samples 1-bit data of the initialization address at a certain timing and determines the 1-bit data to be of a high level or low level based on the sampled value.

14. The communication system according to claim 12, wherein said initialization address reception means includes:

sampling means which samples 1-bit data of the initialization address at a certain timing;

number-of-sampling determination means which determines whether or not the number of times of sampling has reached a certain count value; and 1-bit data determining means which determines the 1-bit data to be a high level or low level based on the sampled value in response to the determination of said number-of-sampling determination means that the number of times of sampling has reached the count value.

15. The communication system according to claim 12 further including:

interrupt process enabling means which enables the interrupt process on completion of the reception process for all bit data of the initialization address by said initialization address reception means.

16. The communication system according to claim 9, wherein said frequent occurrence determination means comprises:

means for determining whether or not said framing error detection means has detected framing errors at least a certain number of times.

17. The communication system according to claim 9, wherein said frequent occurrence determination means comprises:

means for determining whether or not the number of times framing errors are detected by said framing error detection means is a certain proportion or more than the number of times of the interrupt process is initiated.

18. The communication system according to claim 9, wherein said frequent occurrence determination means comprises:
   means for determining whether or not the number of times framing errors are detected by said framing error detection means is a certain proportion or more during the time period since the first detection of a framing error by said framing error detection means.

19. A slave unit which forms a communication system by being connected to a master unit through a communication line and is used to initiate an interrupt process upon detecting a stop bit of byte data sent from said master unit through said communication line to thereby receive the byte data from said master unit, said slave unit comprising:
   framing error detection means for detecting a framing error which occurs when the stop bit of the byte data received by the slave unit is an incorrect value;
   frequent occurrence determination means which determines how frequently framing errors are detected by said framing error detection means and whether or not said framing error detection means has detected a high number of framing errors; and
   interrupt process inhibit means which inhibits the interrupt process in response to the determination by said frequent occurrence determination means that said framing error detection means has detected a high number of framing errors; wherein said slave unit controls a vehicle operation;
   said slave unit and said master unit communicate vehicle-related data through said communication line; and
   the detection of the high number of framing errors is used to eliminate framing errors caused by a noise signal in the vehicle.

20. The slave unit according to claim 19, wherein said vehicle operation controlled by said slave unit is an engine operation.

21. The slave unit according to claim 19, wherein said vehicle operation controlled by said slave unit is a transmission operation.

22. A slave unit for forming a communication system with a master unit which diagnoses vehicle operation and initiating an interrupt process upon detecting a stop bit of byte data sent from said master unit through a communication line to thereby receive said byte data, said slave unit comprising:
   framing error detection means for detecting a framing error which occurs when the stop bit of the byte data received by said slave unit is not a correct value;
   frequent occurrence determination means which determines how frequently framing errors are detected by said framing error detection means and whether or not said framing error detection means has detected a high number of framing errors; and
   interrupt process inhibit means which inhibits the interrupt process in response to the determination by said frequent occurrence determination means that said framing error detection means has detected a high number of framing errors; and
   wherein said slave unit controls at least one of a vehicle engine operation and a vehicle transmission operation; and the detection of said high number of framing errors is used to eliminate framing errors caused by a noise signal in the vehicle.

23. A communication system for a vehicle comprising:
   a communication line;
   a master unit connectable with the communication line for producing and transmitting a request message to the communication line and receiving from the communication line a response message produced in response to the request message, the request message including a plurality of predetermined byte data and each byte of said predetermined byte data having high and low output levels; and
   a slave unit mounted on the vehicle for vehicle control and connectable with the communication line, the slave unit performing a requested process in response to the request message of the master unit transmitted through the communication line and producing and transmitting the response message to the communication line;
   wherein the master unit is programmed to:
      (1) produce and transmit to the communication line an initialization signal having a fixed output level for a period longer than that of said each byte of the request message, the initialization signal initializing a communication process; and
      (2) then produce the request message at a predetermined baud rate; and
   the slave unit is programmed to:
      (1) initiate an interrupt process in response to the request message upon receiving a stop bit of the predetermined byte data of the request message;
      (2) determine whether at least the stop bit is acceptable or unacceptable;
      (3) if acceptable, proceed to a receiving process of the predetermined byte data of the request message;
      (4) if unacceptable, determine whether the unacceptable stop bit occurs in a predetermined frequent occurrence pattern indicative of a transmission of the initialization signal from the master unit, inhibits the interrupt process in response to the determination that the unacceptable stop bit occurs in the predetermined frequent occurrence pattern and switches the receiving process thereof for the request message at the predetermined baud rate to the initialization signal; and
      (5) produce the response message of a plurality of predetermined byte data corresponding to the request message after completely receiving all of the predetermined byte data of the request message.

24. The communication system according to claim 23, wherein the predetermined frequent occurrence pattern includes a plurality of successive occurrences of the unacceptable stop bit.

25. The communication system according to claim 23, wherein the predetermined frequent occurrence pattern includes a plurality of occurrences of the unacceptable stop bit within a predetermined time period.

26. The communication system according to claim 23, wherein the predetermined frequent occurrence pattern is determined to distinguish whether an occurrence of the unacceptable stop bit is caused by a noise signal in the vehicle.

* * * * *